July 16, 1957 T. P. MUSGROVE 2,799,645
PROCESS FOR DECONTAMINATING OLEAGINOUS LIQUIDS
Filed March 10, 1954
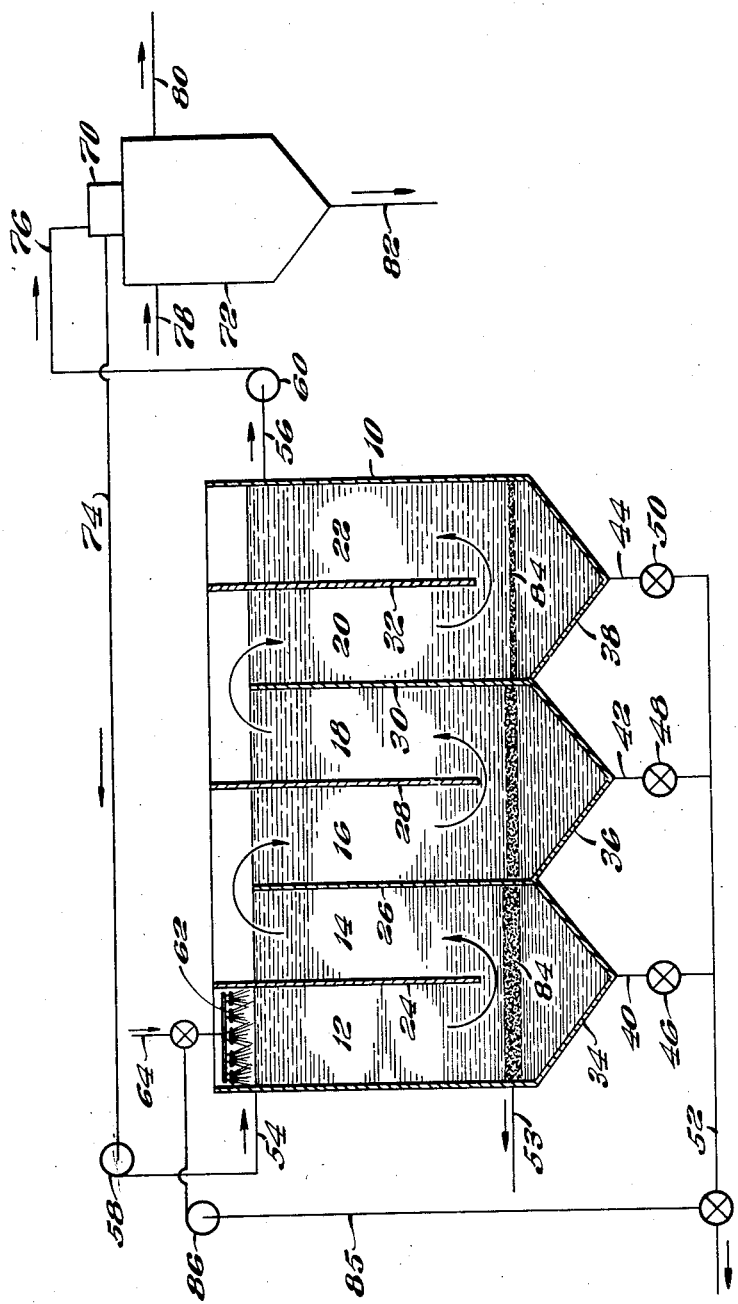
INVENTOR
Thomas P. Musgrove
by Kenneth W Brown, Atty

United States Patent Office 2,799,645
Patented July 16, 1957

2,799,645

PROCESS FOR DECONTAMINATING OLEAGINOUS LIQUIDS

Thomas P. Musgrove, Big Spring, Tex., assignor to Godfrey L. Cabot, Inc., Boston, Mass., a corporation of Massachusetts Application March 10, 1954, Serial No. 415,269

3 Claims. (Cl. 210—42)

This invention relates to the decontamination of oil and in particular to a process and apparatus by and in which finely divided solid or liquid contaminants may be separated from oil. It is applicable to the cleaning of any oleaginous liquid which is normally unreactive and immiscible with water and is particularly useful for removing carbon black from electrostatic precipitator seal oil.

Many oil cleaning devices and techniques are known. However, prior to this invention no simple procedure for separating contaminants, particularly finely divided materials such as carbon black, from oil has been available. Because of this lack elaborate precautions have had to be taken to minimize contamination of oils and even with such precautions much valuable oil has eventually had to be discarded as waste.

An outstanding example of an oil contamination problem is that encountered in the operation of electrostatic precipitators employed for the agglomeration of mists and dusts, particularly of carbon black. Such precipitators are provided with oil seals through which the electrodes pass and as such seals are open to the agglomeration zone they quickly become contaminated. Even when a blanket of inert gas is maintained over the seal the finely divided materials filter into the seals. Consequently, the seals must frequently be cleaned and recharged with clean oil during which procedure the entire collection system must be shut down with an important loss of production time. Furthermore, the generation of inert gas is expensive, as is the waste of oil.

Other examples of oil contamination will readily occur to those skilled in the art and it is the provision of a simple, relatively inexpensive process and apparatus for cleaning such oils that constitutes the principal object of this invention.

Another object of this invention is to provide a process which is effective to remove substantially all contaminating material from oleaginous liquids.

A further object is to provide a process for separating from such liquids finely divided solids and liquids which are of of higher specific gravity than said liquids.

A further object is to provide a process in which a finely divided spray of water alone may serve the purpose of this invention.

A specific object of this invention is to provide a process for cleaning electrostatic precipitator seal oil.

Another object of this invention is to provide a novel apparatus in which the process of this invention may advantageously be carried out.

Briefly stated, the process of this invention comprises continuously flowing a stream of contaminated or "dirty" oil into the upper zone of the first of a series of chambers which intercommunicate alternately at bottom and top, showering the surface of the pool of oil thus maintained in said first chamber with a mist or finely divided spray of water or aqueous liquid and flowing the mixture of oil and water thus formed through the remainder of the series of chambers. The fluids thus travel a sinuous, alternately downward and upward path with an abrupt reversal of direction at the apexes of its serpentine trajectory. In the course of fluids travel, accentuated by the abrupt change in direction of flow in the bottom zone of the chambers, the water is separated from the oil, carrying most of the contaminating material with it and is withdrawn therefrom. I have found that passage through a series of three pairs of chambers is sufficient to remove practically all of the foreign material from the oil to provide a clean oil containing less than 1% contaminants, and very high cleaning efficiency may be achieved by use of only two pairs of separating chambers.

This invention will better be understood and appreciated from the following description thereof taken in connection with the accompanying drawings of one embodiment of the novel apparatus of the invention in which the single figure is a diagrammatic view in side elevation of the oil cleaning apparatus connected to an electrostatic precipitator oil seal.

The apparatus comprises a large tank 10 divided into a series of compartments 12, 14, 16, 18, 20 and 22 by partial walls 24, 26, 28, 30 and 32, respectively. Walls 24, 28 and 32 are secured to the opposing side walls of the tank 10 and extend from above normal liquid level therein downward for the major portion of the depth of the tank. Walls 26 and 30 are likewise secured to the tank side walls and extend from bottom points therein upward for the major portion of its height. Thus, individual compartments are formed which intercommunicate in series alternately at bottom and top.

Tank 10 is preferably provided with a series of hopper bottom sections 34, 36 and 38 having their apexes substantially aligned wtih walls 24, 28 and 32, respectively, to facilitate removal of contaminants as later described. Discharge ducts 40, 42, and 44 and values 46, 48, and 50 therefore are provided for each hopper section, respectively, and are connected by a main duct 52. However, the design of the tank bottom is a matter of choice and a flat, round, sloped, etc. floor equipped with suitable drainage means is quite satisfactory. Auxiliary discharge pipes 53 (one shown) may be provided in the side walls of the tank for the purpose hereinafter described.

A dirty oil inlet pipe 54 connects into the first compartment 12 at any convenient point at or above normal liquid level therein. A clean oil discharge pipe 56 is likewise connected into compartment 22, the last of the series, at or slightly below normal liquid level therein. Pumps 58 and 60 are provided as needed to maintain circulation of oil through the system.

In the top zone of first compartment 12 there is provided a fluids spray, collectively designated by numeral 62, supplied through pipe 64 with water or aqueous liquid under pressure by any suitable means. This spray may be of any convenient design suitable to provide reasonable atomization of the liquid and to distribute it reasonably uniformly over the surface of the oil in the compartments. Thus, depending upon the area of the compartment and the volume of spray liquid required the spray may be a single full cone, full jet, pin jet or hollow cone spray nozzle or plurality thereof. An additional spray of similar type may likewise be provided in succeeding compartments 16 or 20 but ordinarily such is not necessary.

The apparatus thus far described is a complete unit which may be operated for the cleaning of any contaminated oil as indicated above. However, for illustrative purposes, it is shown, though disproportionately, as being connected in series with the oil seal 70 of an electrostatic precipitator 72. Thus, dirty oil is discharged from the oil seal through pipe 74 and is propelled by pump 58 into tank inlet pipe 54. The clean oil discharged through pipe 56 is pumped by pump 60 into the oil seal through pipe 76. Gases being treated in precipitator 72 flow in and out through conduits 78 and 80, respectively, and separated solids or liquids are recovered through discharge duct 82 in the usual fashion.

Although the contaminants separated from the oil in tank 10 may remain in the water originally admixed therewith such is not always the case. For example, when separating carbon black from oil it tends to form a water buoyant slurry and collects in a layer 84 between the bodies of oil and water. In such case the slurry may be drawn off through pipes 53 leaving substantially clean water to be discharged at the bottom of tank 10. When sufficiently clean the water may be recycled to spray 62 through pipe 85 and pump 86.

While the apparatus as illustrated in the drawing is the preferred embodiment thereof modifications within the scope of this invention will suggest themselves to those skilled in the art and may be made without departing from the spirit of the invention.

The process is carried out in the illustrated apparatus as follows. Dirty oil is continuously pumped into the top of compartment 12 and water or aqueous solution is continuously sprayed thereinto at a rate of flow equal to at least 3% and up to about 60% by weight of that of the oil. For most commercial operations water will preferably be supplied at the rate of about 5–20% of the oil flow rate.

The mixture of finely divided water droplets and oil flows slowly downward through the compartment during the course of which the water becomes attached to the greater proportion of the contaminating material. The fluids then flow beneath partition wall 24 into and up through the second chamber 14, thence over wall 26, down through chamber 16 and so on. As the current makes a 180° turn under wall 24 most of the water settles out and a layer of contaminant-water slurry tends to form between the resultant oil and water interfaces.

As the fluids flow through subsequent separation zones any contaminating material remaining settles out so that after three separation stages the oil is substantially clean. For some combinations of oil and foreign matter more than three stages may be required and for others only two and even a single stage may be sufficient.

While satisfactory cleaning will in most cases be effected by the use of water sprays alone it may sometimes be advantageous to add cleaning agents in small quantities, up to about 10% thereof, to the water for greater efficiency or to neutralize absorbed acids or alkalies. Suitable cleaning agents might include mildly alkaline salts such as sodium carbonate and sodium silicate, weakly acidic salts or acids such as citrates and acetice acid, and organic or inorganic cleaning agents such as phosphates, soaps and synthetic detergents. Thus, when a water spray is referred to herein the term "water" should be held to include a mixture of water and a suitable cleaning agent as circumstances may require.

This invention will now be described in even greater detail by means of the following specific examples of its practice in the separation of carbon black from precipitator seal oil. However, it should be understood that these examples are for illustrative purposes only and should not be construed as limiting the scope of my invention in any way.

*Example 1*

Oil containing about 20–50 grains of dirt in the form of finely divided grit and carbon black per gallon of oil was passed through a series of three tanks, each divided into two compartments as described. The dirty oil was pumped into the first compartment at a flow rate of about 40 lbs./minute and subjected to a mist of atomized water supplied under a pressure of 15 p. s. i. g. at a flow rate of about 2.6 lbs./minute or about 6.5% by weight of the oil flow rate. The path of oil flow was down through the first compartment, under the divided baffle partition and up through the second compartment. Most of the water and solid particles separated out in the bottom of the first tank from which point they were discharged to waste through the side and bottom drainage pipes. Remaining smaller quantities of water and dirt collected in and were discharged from the bottoms of the second and third tanks in a similar manner and clean oil was recovered from the top side outlet of the final tank. The oil collected at this point was found to be substantially free of foreign matter and in excellent condition for reuse and it was, therefore, returned to service in the electrical precipitator oil seal.

The details on the design of the equipment used in the above process are as follows: The tanks consisted of a main cylindrical section 3½ feet in diameter and 6 feet high and a conical bottom section tapering down to a bottom discharge drainage pipe of 1 inch in diameter. The height of the conical bottom section was 1½ feet. The upper part of the cylindrical section of each tank was completely divided into two compartments of semicircular cross-section by means of a 5 foot long rectangular plate baffle positioned diametrically across the tank and welded to the walls thereof and extending substantially vertically from the top cover of the tank for its full length. The two side outlet openings in the outer side walls of the first tank were each about 2 inches in diameter and were located about one foot below the top of the tank.

The atomizing equipment in the head space of the first tank consisted of a single P–54 pin jet nozzle manufactured by Bete Fog Nozzle, Inc., centrally located in the side compartment of the first tank into which the oil was introduced, the distance of the nozzle tip above normal liquid level in the tank being about 8 inches. The P–54 nozzle is of the type described in U. S. Patent No. 2,410,215 and has an orifice diameter of 0.054 inch and a rated water flow capacity of from 16 gallons per hour at 10 p. s. i. pressure to 51 gallons per hour at 100 p. s. i.

The bottom discharge pipe and the side outlet openings in the remaining tanks were similar in size and location to those in the first tank.

*Example 2*

Essentially the same process as in Example 1 was carried out on a similarly contaminated oil from an electroprecipitator oil seal. However, in this case the tanks consisted of 8 feet long sections approximately 3' x 3' square in cross-sectional shape with relatively flat tops and bottoms. The baffle dividing the upper part of each tank into two separate compartments was a flat plate about 6' long and 4.24' wide forming a partition diagonally across the opposite corners. The inlet and outlet openings in the outer wall of each tank were 3 inches in diameter and located about 15" below the top of the tank and near the corners.

The flow rate of the oil in this case was about 75 lbs./min. and the amount of water sprayed totalled 10 lbs./min. or about 13.4% of the oil flow rate. In this case, the atomizing equipment consisted of a feed manifold into which were connected five P–54 Bete pin-jet fog nozzles uniformly distributed over the area.

The results obtained in this example were equally as good as those obtained in Example 1.

*Example 3*

The process of Example 2 was carried out by means of the same apparatus in order to clean and reclaim spent lubricating oil salvaged from crankcases of internal combustion engines. Using an oil flow rate of 100 lbs./min. and aqueous liquid flow rate of 20 lbs./min. or 20% of the oil flow rate, excellent clarification and dirt removal was obtained. A 1% solution of sodium carbonate was added to the spray water in this case.

For the purposes of this specification and the claims which follow, "aqueous liquid" shall be defined to mean any liquid or solution containing at least about 90% water.

This process and apparatus have proved to be very effective for treating a wide variety of oleaginous liquids, especially for the removal of certain types of very finely divided suspended matter and are eminently suited to commercial operations by virtue of their inherent simplicity and economy. No high pressures are required, hence plugging difficulties are avoided and power requirements are low. Operations can be carried on at ordinary temperatures and atmospheric pressure so that no special materials of construction are required and expensive types of fabrication are avoided.

Many widely different modifications and embodiments of this invention will be readily apparent to anyone skilled in the art and I do not, therefore, intend to limit the scope of my invention other than as indicated in the appended claims.

Having thus described my invention, what I claim as new and desire to secure by Letters Patent are:

1. A process for separating solid contaminants from oleaginous liquids comprising mixing water with said contaminated liquid to form a mixture, flowing said mixture downwardly against the upper surface of a submerged aqueous body to cause at least part of the water and solid contaminants to separate from said mixture and to collect in said aqueous body, then flowing said liquid upwardly from the upper surface of said body in substantially purified form.

2. A process for separating solid contaminants from oleaginous liquids comprising flowing the contaminated liquid onto the surface of a submerged aqueous body to form a pool of contaminated liquid, spraying the surface of said pool with water, circulating the liquid with the water mixed therewith downwardly against the upper surface of said aqueous body and then upwardly therefrom to cause at least part of the water and solid contaminants to separate from said liquid and collect in said aqueous body, and withdrawing said liquid above the upper surface of said submerged aqueous body.

3. A process for separating water-bouyant solid contaminants from oleaginous liquids of specific gravity less than said solids comprising mixing water with said contaminated liquid to form a mixture, flowing the mixture downwardly against the upper surface of a submerged aqueous body to cause at least part of the water and solids to separate from said liquid, said water collecting in said aqueous body and said solid contaminants collecting in an intermediate layer on the upper surface of said aqueous body, then flowing said liquid upwardly from the upper surface of said body in substantially purified form, withdrawing water from said body to maintain a substantially constant level thereof, and withdrawing solids from said intermediate layer.

References Cited in the file of this patent

UNITED STATES PATENTS

| | | |
|---|---|---|
| 437,659 | Noppel | Sept. 30, 1890 |
| 613,728 | Shively | Nov. 8, 1898 |
| 681,170 | Hudson | Aug. 20, 1901 |
| 691,835 | Wyman | Jan. 28, 1902 |
| 1,302,094 | Skidmore et al. | Apr. 29, 1919 |
| 1,682,939 | Schwab, et al. | Sept. 4, 1928 |
| 1,768,209 | Miller | June 24, 1930 |
| 1,770,736 | Funk | July 15, 1930 |
| 1,838,029 | Isles | Dec. 22, 1931 |
| 2,305,464 | Ashworth | Dec. 15, 1942 |
| 2,539,344 | Carraway | Jan. 23, 1951 |

FOREIGN PATENTS

| | | |
|---|---|---|
| 326,267 | Germany | Sept. 25, 1920 |